(United States Patent [19])

Berkopec et al.

[11] Patent Number: 4,549,122
[45] Date of Patent: Oct. 22, 1985

[54] METHOD AND CIRCUIT FOR DC MOTOR FIELD REGULATION WITH SPEED FEEDBACK

[75] Inventors: William E. Berkopec, Milwaukee; James A. Burns, Menomonee Falls, both of Wis.

[73] Assignee: Allen-Bradley Company, Milwaukee, Wis.

[21] Appl. No.: 532,067

[22] Filed: Sep. 14, 1983

[51] Int. Cl.⁴ .............................................. H02P 5/06
[52] U.S. Cl. .................................. 318/338; 318/326; 318/327; 318/331
[58] Field of Search ............... 318/405, 406, 326, 327, 318/331, 338, 350, 356

[56] References Cited

U.S. PATENT DOCUMENTS

| | | | |
|---|---|---|---|
| 3,657,623 | 4/1972 | Fludzinski | 318/326 |
| 3,795,850 | 3/1974 | Grygera | 318/331 |
| 3,950,684 | 4/1976 | Peterson | 318/338 |
| 3,969,660 | 7/1976 | Ruppert | 318/338 |
| 3,996,504 | 12/1976 | Grzebielski | 318/258 |
| 4,484,117 | 11/1984 | Bose | 318/338 |

OTHER PUBLICATIONS

Allen–Bradley Company, "Thyristor Regulated DC Motor Control", 1973.
SWEO Engineering Inc., Field Regulator and Associated Circuitry, 1981, as disclosed in Exhibit A.
Reliance Electric Instruction Manual D-3867-1, Max Pak Plus Spindle Drive, Sep. 1981, pp. 45–47.

Primary Examiner—Ulysses Weldon
Attorney, Agent, or Firm—Quarles & Brady

[57] ABSTRACT

A method and a circuit for motor field regulation in the constant horsepower speed range, wherein the weakening of field current allows operation of the motor at speeds higher than the base speed while maintaining rated armature voltage. The field current is weakened in response to speed feedback signals to provide a rapid response in controlling field current. The motor field is also regulated in response to a counter-EMF and IR compensation circuit to further weaken the field current, where the counter-EMF developed in the DC motor would cause excessive voltage across the armature.

6 Claims, 10 Drawing Figures

$V_T = CEMF + (IA)(RA)$

MOTORING FORWARD

FIG. 6a $V_T = CEMF - (IA)(RA)$

REGENERATING FORWARD

FIG. 6b $-V_T = -CEMF - (IA)(RA)$

MOTORING REVERSE

FIG. 6c $-V_T = -CEMF + (IA)(RA)$

REGENERATING REVERSE

FIG. 6d

METHOD AND CIRCUIT FOR DC MOTOR FIELD REGULATION WITH SPEED FEEDBACK

BACKGROUND OF THE INVENTION

The invention relates to DC motor controls, and more particularly to those controls which include a motor field regulator circuit for regulating the current supplied to a field winding of a DC motor.

The outstanding characteristic of a DC motor is its adaptability to control of its torque and speed. The typical DC motor comprises two primary parts, a field which is stationary, and an armature which rotates. The field may be either a permanent magnet or an electromagnet, and its purpose is to establish magnetic poles on the frame of the motor, which act in conjunction with the magnetic poles of the armature to provide the forces that cause rotation of the armature. Magnetic flux is induced in the poles of a field electromagnet pole by passing a field current through a field winding which is wrapped in numerous turns around the poles.

The armature consists of a plurality of windings, which are connected to terminals on the motor through a commutator and brushes. The commutator serves to switch power to successive coils as the armature rotates, so that the magnetic armature poles remain in the same location relative to the field poles.

The horsepower output of a DC motor in electrical terms is proportional to (1) the current through its field winding, (2) the current through its armature and (3) the rotational speed of the armature. This can be expressed in an equation as follows:

$$H.P. = K I_F I_A S \qquad (1)$$

where:
H.P. = horsepower
$I_F$ = field current
$I_A$ = armature current
S = rotational speed of the armature
K = a constant The horsepower output of the motor—in mechanical terms—is provided by the product of (1) output torque and (2) the rotational speed of the armature. This can be expressed in an equation as follows:

$$H.P. = TS \qquad (2)$$

where:
H.P. = horsepower
T = output torque
S = rotational speed of the armature

The right sides of equations (1) and (2) can be equated and the rotational speed of the armature cancelled from each side to produce:

$$T = K I_F I_A \qquad (3)$$

As a result of these relationships, the operation of a DC motor can be summarized by referring to two basic ranges of speed control. The first range is known as the "constant torque" range and the second range is referred to as the "constant horsepower" range. In the "constant torque" range the ability of the motor to deliver torque to a load is not affected by an increase in speed, because it has not yet reached its maximum horsepower or armature current. Thus, for example, if the field winding carries a full rated field current, the speed of the motor can be increased by varying the applied armature voltage. Speed will increase with armature voltage until the motor reaches a speed known as the "base speed" which corresponds to the speed at which rated horsepower is obtained at rated armature current and rated armature voltage of the motor.

If it is desired to operate the motor above the base speed, it becomes necessary to weaken the field, since further increases in armature voltage are not permitted by the maximum ratings of the motor. From equation (3) it will be seen that a reduction in field strength and field current will be accompanied by a proportionate reduction in available maximum torque. As seen from equation (2) above, the decrease in torque will allow an increase in speed if horsepower remains constant. There are a number of loads that can be controlled with reduced torque, but which require speeds higher than the base speed. It is therefore advantageous to provide a motor control that will operate at speeds higher than the base speed. This speed range is known as the "constant horsepower" range of operation.

One prior approach to weakening field strength for operation in the "constant horsepower" range utilized circuitry that responded to changes in measured armature voltage. This response was considered to be a slow and somewhat coarse adjustment. The reason that such an adjustment is not as fine as desired, is that the voltage measured across the armature ($V_T$) is not always a true measure of the voltage generated by a DC motor. The voltage generated by the motor is referred to as the counter-EMF, since its polarity is opposite to the applied voltage.

When the DC motor is operated in a motoring mode, the armature voltage ($V_T$) is equal to the sum of the motor counter-EMF and the voltage drop due to current flow in the armature windings. The DC voltage drop can be expressed as the product of the DC armature current ($I_A$) and the resistance of the armature ($R_A$). The result is the following two expressions:

$$V_T = CEMF + I_A R_A \qquad (4)$$

$$CEMF = V_T - I_A R_A \qquad (5)$$

When the DC motor is operated in the regenerating mode, the polarity of the armature voltage ($V_T$) and the polarity of the counter-EMF remain the same, but the polarity of armature current ($I_A$) is reversed to provide the following two expressions:

$$V_T = CEMF - I_A R_A \qquad (6)$$

$$CEMF = V_T + I_A R_A \qquad (7)$$

The counter-EMF is a function of field strength. In some instances, a reduction in field current will not cause a proportionate reduction in field strength, due to operation of the field electromagnet in its nonlinear range. The counter-EMF is also a function of speed, so an increase in speed above the base speed and a decrease in field current will satisfy equation (1) above, but it will result in an excessive counter-EMF. At "no load", the $I_A$ term in equations (4)–(7) is zero, and the voltage measured across the armature ($V_T$) is equal to counter-EMF. Under load conditions, however, this is no longer true. Because the prior approach to weakening field strength did not compensate for the IR voltage drop under load conditions, it provided only a coarse adjustment to field current in response to armature voltage.

SUMMARY OF THE INVENTION

The invention resides in a method and a circuit for weakening field current in a DC motor in response to a speed feedback signal, when the speed feedback signal represents a speed higher than the base speed.

The invention involves generating a speed error signal in response to a speed command input in the constant horsepower range, and driving the motor armature above base speed in response to the speed error signal. The speed of armature rotation is sensed to generate a speed feedback signal proportional to the speed of armature rotation. A field reference signal is provided to energize the field winding at rated field current, and this field reference signal is reduced when the speed feedback signal represents a speed greater than the base speed to cause a reduction in field current below rated field current.

The primary object of the invention is to improve the operation at speeds in the "constant horsepower" range by responding to speed feedback. This is in contrast to the prior approach of relying primarily on armature voltage feedback.

A further object of the invention is to retain and improve the response to armature voltage, by detecting a change in counter-EMF, which is a function of both the measurable armature voltage and the IR voltage drop in the armature under load conditions.

These and other objects and advantages of the invention will be apparent from the description and the accompanying drawings which are incorporated herein. The description and drawings disclose a preferred embodiment which is presented by way of example, and not by way of limitation. To understand the scope of the invention, the reader should refer to the claims which follow the description.

DETAILED DESCRIPTION OF THE PREFERRED EMBODIMENT

Figure 1:
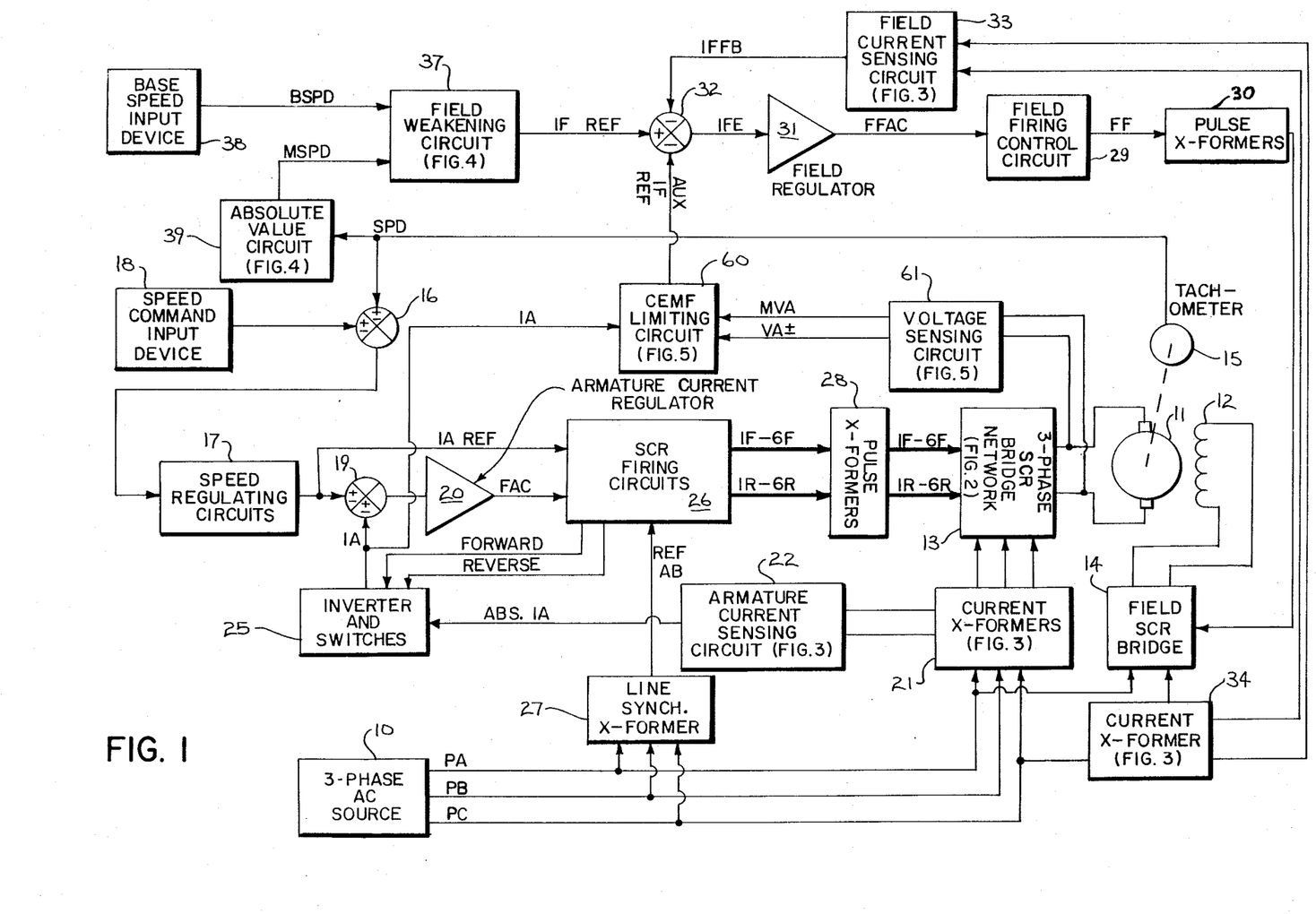
FIG. 1 is a system block diagram for the DC motor drive that incorporates the present invention.

Referring to FIG. 1, the invention is illustrated in the context of a DC motor drive which is connected between a three-phase AC power source 10 and an armature 11 and a field winding 12 of a DC motor. The motor drive controls the speed and direction of rotation of the armature which may be connected to a load through a rotating output shaft (not shown). To cause the motor to both speed up and slow down in either the clockwise or counterclockwise direction of armature rotation, the motor drive must be of the type for "four quadrant" operation. In this type of operation the DC motor has two modes of operation in each direction of rotation. In one mode it is motoring and receiving power from the power source 10, and in the other mode it is regenerating and supplying power back to the power source 10. In the motoring mode, armature current is applied to the motor to generate torque in the same direction as the armature is rotating. In the regenerating mode, the armature current is reversed to generate a torque that is counter to the direction of armature rotation, which provides a braking effect.

Figures 2, 3:
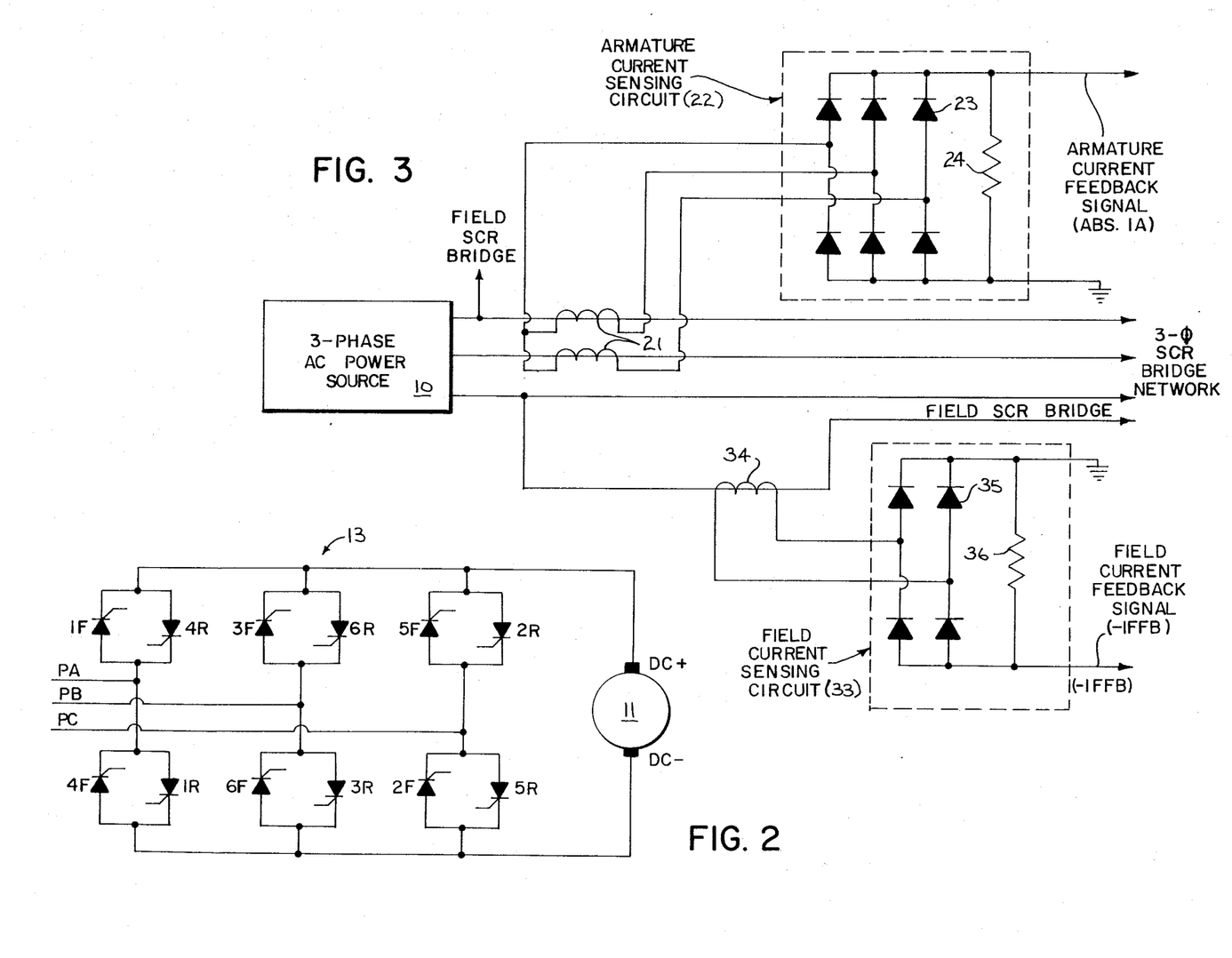
FIG. 2 is a detail schematic of the three-phase SCR bridge of FIG. 1.
FIG. 3 is a detail schematic of the field current and armature current sensing circuitry of FIG. 1.

The motor drive controls the direction of current through the armature 11 using a three-phase SCR bridge network 13. As seen in FIG. 2, this bridge network 13 has twelve SCR's rectifying alternating current from the three-phase AC source and supply lines PA, PB and PC. Six SCR's 1F–6F convert three-phase alternating current to forward direct current, while six other SCR's, 1R–6R convert alternating current to reverse direct current. The SCR's are "turned on" to conduct current in response to firing signals received at their respective gate inputs. This dual bridge network 13 characterizes the motor drive as being of the armature-current reversing type.

Referring again to FIG. 1, there is also a single-phase field SCR bridge network 14 coupled across supply lines PA and PC and connected across the field winding 12 for converting single phase alternating current to direct current for the field winding 12.

One basic function of the motor drive is to sense the difference between a speed command input signal and a speed feedback signal and change the speed of the motor to reduce the error or difference between the two signals. As seen in FIG. 1, a speed error feedback loop includes a tachometer 15 which senses the actual speed of armature rotation and generates a speed feedback (SPD) signal to a summing input 16 for a group of speed regulating circuits 17. A speed command input signal is provided to this summing input 16 by a speed command input device 18. This device 18 can, for example, be a potentiometer that is operated to vary a DC signal. The difference between the speed input signal and the speed feedback (SPD) signal is amplified by the speed regulating circuits 17 and a transformed speed error signal is generated at the output of these circuits 17.

The transformed speed error signal cannot be used to directly operate the three-phase SCR bridge 13. It is instead used as a reference signal (IA REF) for controlling armature current. To provide accurate control of armature current there is an inner feedback loop in which the magnitude of armature current is sensed and compared to the armature current reference signal (IA REF) at summing input 19. The difference between the armature current reference signal (IA REF) and the actual armature current is amplified by an armature current regulator 20. It responds to this difference to generate a firing angle control (FAC) signal which determines the level of voltage that should be applied to the motor armature 11.

The DC armature current is sensed by using current transformers 21 that are connected to the AC side of the bridge network 13. The detected current is coupled to an armature current sensing circuit 22. As seen better in FIG. 3, this circuit includes six diodes 23 and a burden resistor 24 connected to rectify the AC current and generate its DC value as the ABS.IA signal. When an alternating waveform is rectified only positive half-cycles appear, and thus the ABS.IA signal is an absolute value signal which is always positive. Referring again to FIG. 1, the IA REF signal can be either positive or negative depending upon the polarity of the signals at summing input 19. The ABS.IA signal is therefore converted to a dual polarity signal IA before being summing with the IA REF signal at the summing input 19.

To control the polarity of the IA signal, the ABS.IA signal is coupled through an inverter and two switches 25 to the summing input 19. One switch is controlled by a FORWARD enable line, while the other switch—which is connected in series with the inverter—is controlled by a REVERSE enable line. When armature current is to flow in the forward direction, the IA REF signal is negative and the switch connected to the FORWARD enable line is signaled to close so that the ABS.IA signal bypasses the inverter and remains positive. When armature current is to flow in the reverse direction, the switch connected to the REVERSE enable line is signaled to close so that the ABS.IA signal will be inverted to produce an IA signal of negative polarity. Thus, the IA REF and IA signals are of opposite polarity for negative feedback and system stability.

The armature current regulator 20 responds to the resulting input at the summing junction 19 to generate the firing angle control (FAC) signal at its output. The output of the armature current regulator 20 is connected to a suitable group of SCR firing circuits 26 which synchronize the firing angle control (FAC) signal to signals which correspond to the line-to-line phase-varying signals provided by the three-phase source 10 and its associated conductors PA, PB and PC. The phase corresponding signals are derived from a REF AB signal which is coupled from conductors PA and PB through a line-synchronizing stepdown transformer 27. The SCR firing circuits 26 generate signals IF–6F and IR–6R corresponding to the SCR's in the three-phase dual bridge network 13. Further details concerning these circuits 26, while not germane to the present invention, are provided by a concurrently filed U.S. patent application "Compensated Ramp Generating Circuit for Controlling SCR Firing", which Ser. No. 532,065, is incorporated herein by reference. The control lines from the SCR firing circuits 26 are coupled to the bridge network 13 by pulse transformers 28 which provide for physical and electrical isolation between the higher voltage AC power circuits and the lower voltage DC control circuits.

The field SCR bridge 14 in FIG. 1, which couples direct current to the field winding 12, is operated in response to field firing signals (FF). These are received from a field firing control circuit 29 which is similar to the other SCR firing circuits 26, but which is synchronized to only one phase of the AC source 10. This circuit 29 is coupled to the bridge network 14 through pulse transformers 30. The field firing control circuit 29 generates the phase-synchronized firing (FF) signal in response to a field firing angle command (FFAC) signal received from the output of a field regulator 31. The field regulator 31 amplifies a field current error (IFE) signal to generate the FFAC signal. The magnitude of the FFAC signal determines the magnitude of the voltage that is applied to the field winding 12 by firing the SCR's in the field SCR bridge network 14. This field current error (IFE) signal represents the algebraic sum of a field current reference (IF REF) signal, an auxiliary field current reference (AUX REF) signal, and a field current feedback (IFFB) signal.

The field current feedback (IFFB) signal is coupled to the summing junction 32 from the output of a field current sensing circuit 33. This circuit 33 receives AC signals proportional to field current that are detected by a current transformer 34 in the power line to the field SCR bridge 14. Referring to FIG. 3 the current transformer 34 is connected to four diodes 35 and a burden resistor 36, which are arranged to rectify the AC signal and generate the field current feedback (IFFB) signal as a DC voltage signal. This signal (IFFB) is negative, and is opposite to the positive polarity of the field reference (IF REF) signal.

Referring again to FIG. 1, a field weakening circuit 37 provides a field reference signal (IF REF) of +2.0 DC volts corresponding to full rated field current when the motor is operated at base speed or below. The magnitude of the field reference (IF REF) signal is reduced in response to certain values of two speed input signals to the field weakening circuit 37. The first of these is a base speed (BSPD) reference signal which is received at one input from a base speed input device 38. The other input signal is a magnitude of speed (MSPD) signal which is proportional to the actual speed of armature rotation. The tachometer 15 generates a speed feedback signal (SPD) which is coupled through an absolute value circuit 39 to generate the MSPD signal with a positive polarity.

When the speed feedback (SPD) signal is positive, it will be coupled through the absolute circuit 39 without any change in polarity. On the other hand, if a speed feedback (SPD) signal of negative polarity is received, it will be inverted by the absolute value circuit 39 to generate an MSPD signal of positive polarity.

Figure 4:
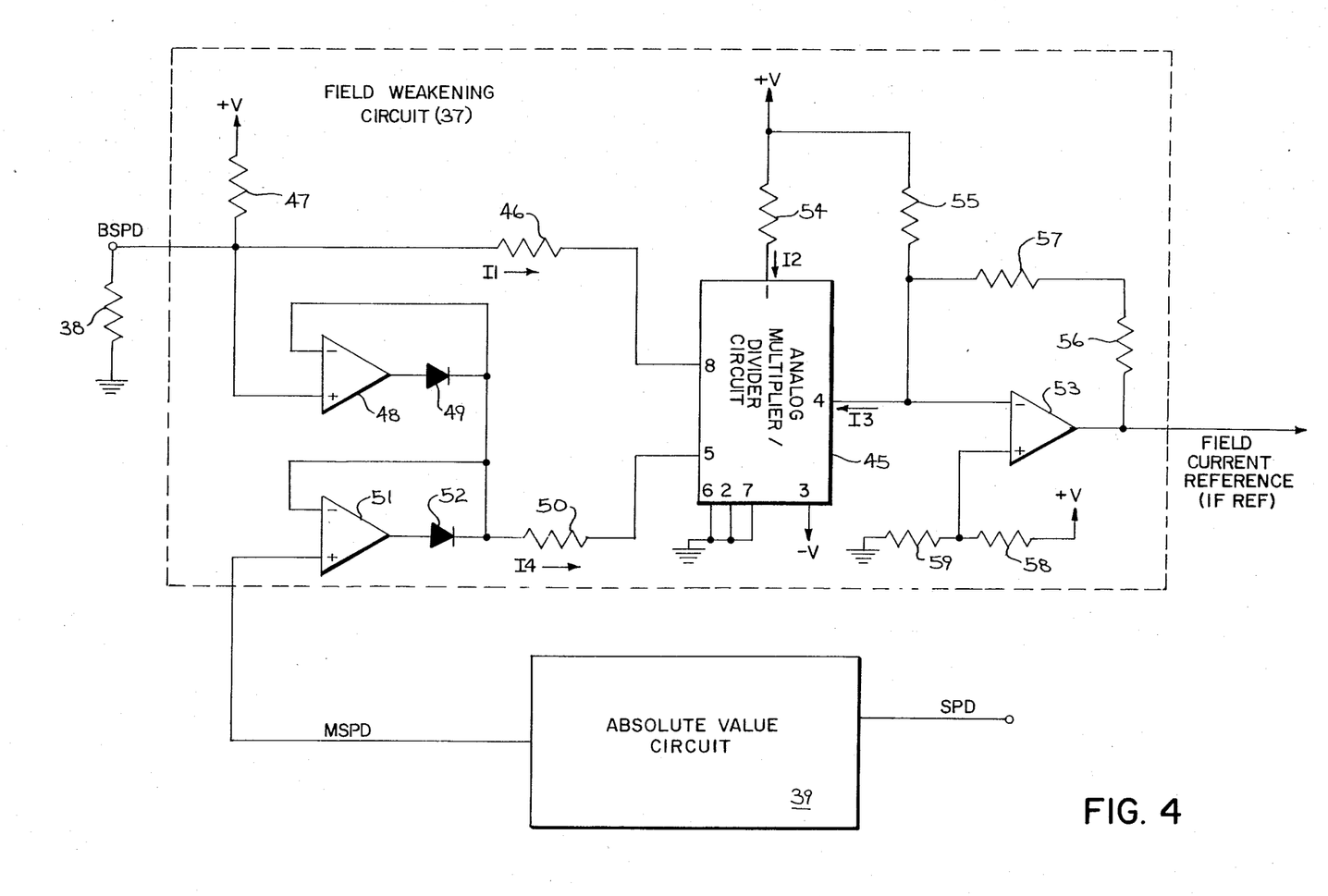
FIG. 4 is a detail schematic of the absolute value circuit and field weakening circuit of FIG. 1.

The field weakening circuit 37, which is shown in detail in FIG. 4, is a voltage multiplying/dividing circuit in which the ratio of the BSPD signal to the MSPD signal is used to proportionally reduce the +2.0 DC volt field current reference (IF REF) signal at the output of the circuit.

At the lower threshold of the constant horsepower range, horsepower can be expressed in terms of field current (IF) and base speed (BSPD) using equation (1) in the introduction.

$$H.P. = K(IF)(IA)(BSPD) \tag{8}$$

where IA is equal to armature current.

In the constant horsepower range, horsepower can also be expressed in terms of a motor speed higher than the base speed (MSPD) and a reduced field current (IF').

$$H.P. = K(IF')(IA)(MSPD) \tag{9}$$

By equating the right sides of equations (8) and (9) and rearranging terms, the following expression for IF' is provided.

$$IF' = IF \frac{(BSPD)}{(MSPD)} \tag{10}$$

Where the motor speed (MSPD) is greater than the base speed (BSPD) it will be apparent from equation (10) that the field current should be reduced. The field current is reduced by operation of the circuit 37 in FIG. 4 in which the field current reference (IF REF) signal is reduced in proportion to ratio of base speed to motor speed. As seen in FIG. 4, this circuit 37 includes an analog multiplier/divider integrated circuit 45 such as an RC 4200 Analog Multiplier/Divider Circuit offered by Raytheon. The integrated circuit 45, as connected in FIG. 4, generates a negative output current I3, which responds to input currents I1, I2 and I4 according to the following relationship:

$$I3 = \frac{(I1)}{(I4)} I2 \qquad (11)$$

As seen in FIG. 4, the BSPD signal and the MSPD signal are used to generate input currents I1 and I4 to "pin 8" and "pin 5", respectively on the analog multiplier/divider circuit 45. The current I1 is proportional to the BSPD signal. The current I4 is also proportional to the BSPD signal when the MSPD signal is less than the BSPD signal. The current I4 becomes greater than the current I1 when the MSPD signal becomes greater than the BSPD signal.

The circuitry for providing this result includes a resistor 46 which connects the BSPD signal input to the "pin 8" input on the analog multiplier/divider circuit 45. The base speed reference (BSPD) signal is provided by a voltage divider in which a pull-up resistor 47 in the field weakening circuit 37 is connected between the base speed input and a positive voltage source (+V). The base speed reference (BSPD) signal can therefore be selected by choosing a resistor as the base speed input device 38. The resistor 38 is connected between the base speed reference (BSPD) line and ground to provide a base speed reference (BSPD) signal of the desired DC level.

The BSPD input is also connected to a non-inverting (+) input on a first operational amplifier 48. The output of this amplifier 48 is connected through a diode 49 to its inverting (−) input and through resistor 50 to the "pin 5" input on the analog multiplier/divider circuit 45. A second operational amplifier 51 receives the MSPD signal at its non-inverting (+) input. The inverting (−) input on this amplifier 51 is connected to the cathode of the diode 49. Another diode 52 is connected between the output of the second operational amplifier 51 and the junction connecting its inverting (−) input to the resistor 50.

The two amplifiers 48 and 51 respond to the BSPD signal and the MSPD signal as follows. The first operational amplifier 48 generates a positive output signal which is coupled through the diode 49 and through the resistor 50 to generate the I4 current when the MSPD signal is less than or equal to the BSPD signal. The positive output signal from the first amplifier 48 is fed to the inverting (−) input on the second amplifier 51, and since this signal is greater than the MSPD signal, the output of the second amplifier 51 will be driven to negative saturation. The diode 52, however, blocks negative current flow. Therefore, the second amplifier 51 is not effective to control the I4 current through resistor 50. The resistors 46 and 50 have the same value as that with the first amplifier 48 controlling the I4 current, the magnitude of the I4 current will equal the magnitude of the I1 current. Referring to equation (11) above it will be seen that I3 output current should then be equal to the I2 biasing current.

The current I4 will become greater than the current I1 when the magnitude of the MSPD signal becomes greater than the magnitude of the BSPD signal. When this occurs, the second amplifier 51 will have a greater positive voltage at its non-inverting (+) input than at its inverting (−) input. A positive signal will be generated at the output of the second amplifier 51 and coupled through the diode 52 and the resistor 50 to generate a current I4 that is greater than the current I1. The signal at the cathode of the diode 52 will also be coupled to the inverting (−) input on the first amplifier 48, to drive its output to negative saturation. The negative output signal will be blocked, however, by the diode 49, and thus the first amplifier 48 will no longer control the current I4 through the resistor 50. The second amplifier 51 then controls the I4 current in proportion to the MSPD signal.

The I2 and I3 currents are established by biasing circuitry and a third operational amplifier 53 connected to the "pin 4" output of the analog multiplier/divider circuit 45. The biasing circuitry includes a first resistor 54 connected between a positive voltage source (+V) and the "pin 1" input of the analog multiplier/divider circuit 45. A second resistor 55 is connected between this positive voltage source (+V) and a connection between the "pin 4" output of the multiplier/divider circuit 45 and the inverting (−) on the output amplifier 53. The non-inverting (+) input of the amplifier 53 is connected to a junction between two resistors 58 and 59 which divide the voltage from a positive voltage source (+V) to provide a biasing signal of +2.0 DC volts at the non-inverting input. The IF REF signal from the output of the amplifier 53 is set for +2.0 DC volts when the motor is running at base speed or below, so for this condition the voltage at the inverting (−) input must also be +2.0 DC volts. It is also known that when the motor is operating at base speed or below the currents I1 and I4 will be equal, and therefore, equation (11) shows that the I3 and I2 currents will then be equal. The value of the resistor 55 is selected for of a voltage drop that provides a +2.0 DC volt signal at the inverting (−) input of the amplifier 53 and an I3 current equal to the I2 current. The inverting (−) input of the amplifier 53 provides nearly an infinite impedance so that current diverted into it can be considered negligible.

The output of the amplifier 53 is also connected through two resistors 56 and 57 back to the inverting (−) input. When the motor is operating at base speed or below, a +2.0 DC voltage appears at both the inverting (−) input and output of the amplifier, so that no current is conducted through resistors 56 and 57. When operating above the base speed, the current I3 will be reduced by an amount of current that is conducted through resistors 56 and 57. This flow of current will produce a voltage drop that reduces the +2.0 DC volt signal at the output of the amplifier 53.

Figure 7:
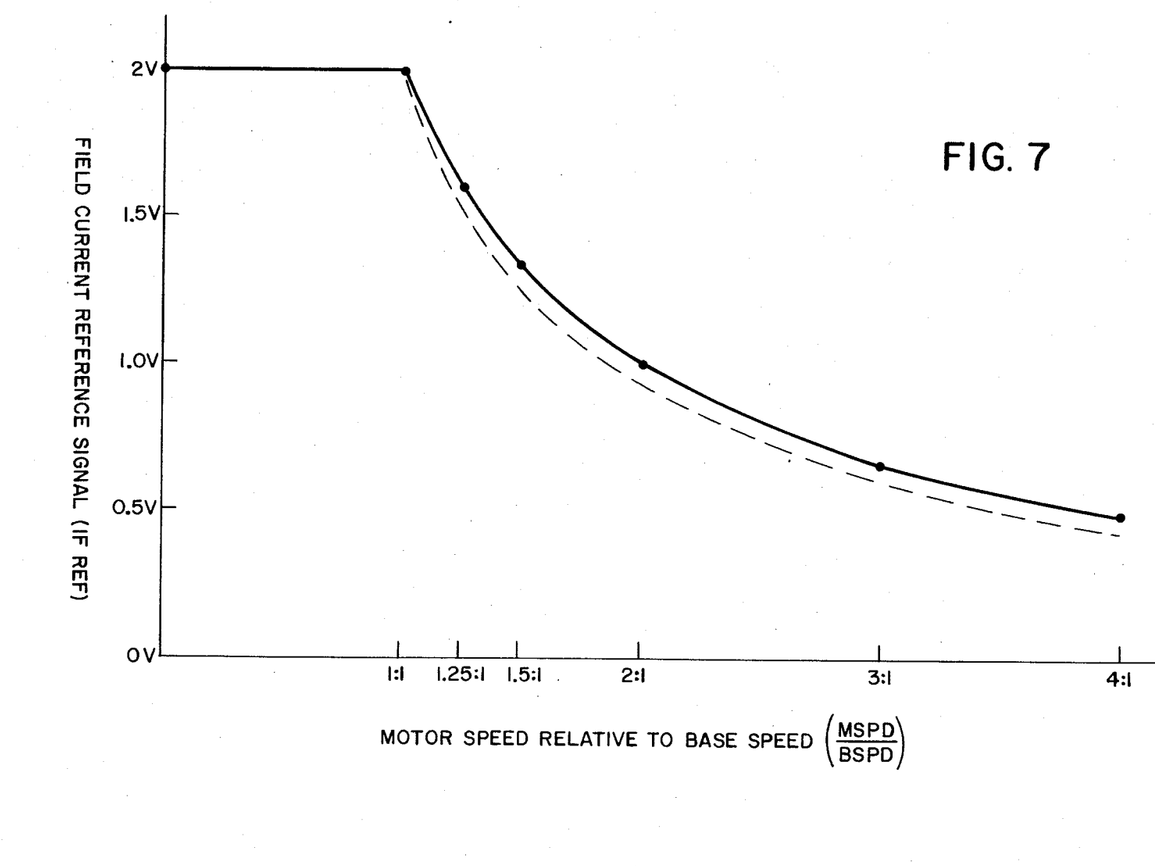
FIG. 7 is a graph of a field current reference (IF REF) signal as a function of relative motor speed.

Referring to FIG. 7, the response of the field current reference (IF REF) voltage to the speed of the motor is illustrated as a function of the ratio of actual motor speed (MSPD) to base speed (BSPD). There it is seen that the IF REF signal will remain at 2.0 volts when the motor is operated below base speed. Above the base speed, the IF REF signal decreases in inverse proportion to the increase in motor speed up to a speed four times the base speed. The solid line in FIG. 7 represents an ideal characteristic. In actual practice it may be found that it is desirable to adjust the curve downward to the dashed line to compensate for the nonlinear behavior of the field current. This adjustment can be accomplished by adjusting the resistance provided by resistors 56 and 57 shown in FIG. 4 to "program" the field weakening circuit 37. This adjustment also allows the application of the motor device to DC motors with different operating characteristics.

Referring again to FIG. 1, it will be seen that the decrease in the IF REF signal will affect the resulting input signal to the field regulator 31, and this will decrease the level of current in the field winding 12. A further aspect of the invention is the adjustment of the output of the field regulator 31 in response to an auxiliary field reference signal (AUX IF REF) signal. This AUX IF REF signal is controlled by a counter-EMF (CEMF) limiting circuit 60. This circuit 60 receives the IA signal from the armature current feedback loop to measure armature current. This circuit 60 also receives a magnitude of armature voltage (MVA) signal and an armature voltage polarity (VA±) signal, these signals being detected by a voltage sensing circuit 61. As explained in the introduction, prior circuits had been known in which field current was in some manner responsive to a measured armature voltage, however, these prior circuits did not compensate for the IR voltage drop, which is necessary for an evaluation of the counter-EMF of the motor. It is the counter-EMF rather than the armature voltage that is more directly related to flux and current in the field. Therefore, the circuits 60 and 61 seen in FIG. 1 have been provided.

Figure 5:
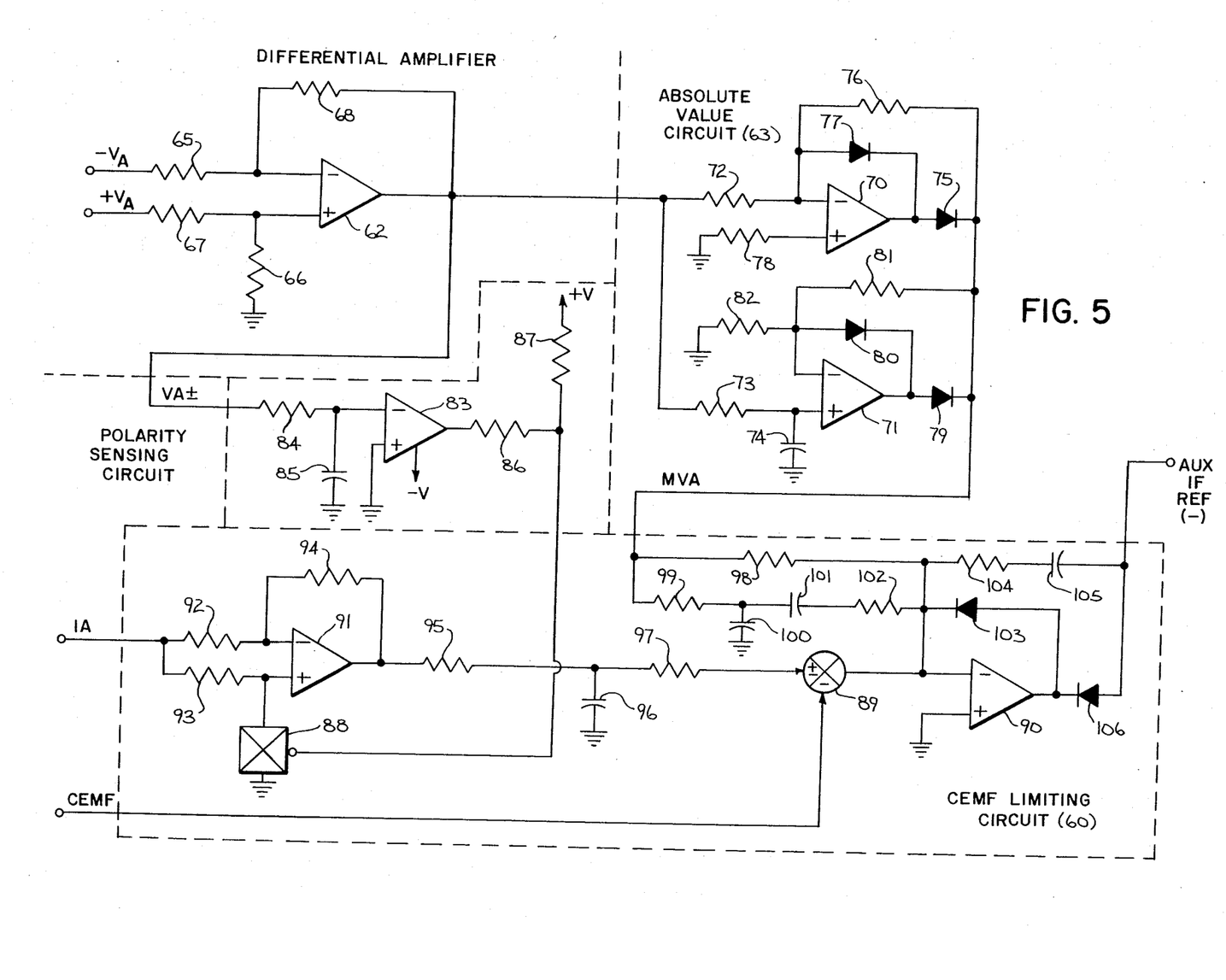
FIG. 5 is a detail schematic of the CEMF limiting circuit of FIG. 1.

Referring now to FIG. 5, the armature voltage sensing circuit 61 of FIG. 1 is comprised of a differential amplifier 62 and an absolute value circuit 63. Also shown in FIG. 5 is a polarity sensing circuit 64 which responds to the armature voltage polarity (VA±) signal to provide a control signal for the CEMF limiting circuit 60.

The differential amplifier 62 has an inverting (−) input connected through a resistor 65 to receive an armature voltage signal ($-V_A$) from the negative side of the armature 11. The non-inverting (+) input is connected through one resistor 66 to ground and through another resistor 67 to receive an armature voltage signal ($+V_A$) from the positive side of the armature 11. To complete the differential amplifier 62 a resistor 68 is connected between its inverting (−) input and its output. The differential amplifier 62 senses the difference between its two inputs and generates an amplified output signal in response to this difference. It will be seen by those skilled in the art that when the armature voltage is positive, a positive signal will be generated at the output of the differential amplifier 62, and when the armature voltage is negative (the signal at the $-V_A$ input being positive with respect to the signal at the $+V_A$ input), the output signal from the amplifier 62 will be negative. Therefore, to develop a signal representing the magnitude of armature voltage, the output of the differential amplifier 62 is coupled to the absolute value circuit 63.

The absolute value circuit 63 includes two operational amplifiers 70 and 71, one operating as an inverter and the other operating as non-inverter for positive signals. The output of the differential amplifier 62 is connected through resistor 72 to an inverting (−) input on the first amplifier 70 and through resistor 73 to a non-inverting (+) input on the second amplifier 71. A capacitor 74 is connected between this input and ground to filter out ripple in the DC voltage signal. The output of the amplifier 70 is connected through a diode 75 to the input on the CEMF limiting circuit 60. The cathode of this diode 75 is also connected through a resistor 76 to the inverting (−) input on the amplifier 70. A second diode 77 is connected between the inverting (−) input and the output, and a resistor 78 is connected between the non-inverting (+) input and ground. When the output signal from the differential amplifier 62 is negative, a positive MVA signal will appear at the output of the amplifier 70 and will be coupled through the diode 75 to the CEMF limiting circuit 60. When the signal to the inverting (−) input is positive, the output of the amplifier 70 will be prevented from going negative by more than a voltage drop of 0.6 volts across the diode 77. The other diode 75 will prevent the output signal from being coupled to the MVA line.

The non-inverting amplifier 71 also has a first diode 79 connected to its output and a second diode 80 connected from its inverting (−) input to its output. A resistor 81 is connected across the cathode of the first diode 79 and the inverting (−) input of the amplifier 71. Another resistor 82 is connected between the inverting (−) input and ground. When a positive signal is received at the non-inverting (+) input, a positive signal is conducted through the output diode 79 and the MVA line. A negative output signal, however, will not appear on the MVA line due to the operation of the diodes 79 and 80 in the manner of the diodes 75 and 77. Thus, the CEMF limiting circuit 60 receives a signal proportional to the magnitude of armature voltage and of positive polarity, even when the polarity of this voltage is negative. This description of the absolute value circuit 63 also describes the absolute value circuit 37 in FIGS. 1 and 4, which is a circuit providing a positive signal for motor speed irrespective of the direction of armature rotation.

Referring again to FIG. 5, the output of the differential amplifier 62 is also connected to the polarity sensing circuit 64, which includes a comparator 83 with an inverting (−) input connected through a resistor 84 to the output of the differential amplifier 62. This inverting (−) input is also connected through a capacitor 85 to ground, to filter out AC ripple from the DC armature voltage signal (VA±). The non-inverting (+) input on the comparator 83 is connected to ground and the output is connected through a resistor 86 to a junction between a pull-up resistor 87 and a control input on an analog switch 88. The pull-up resistor 87 is connected to a positive voltage source (+V). When the output signal from the differential amplifier 62 is positive, the output signal from the comparator 83 switches to a logic low level which generates a logic low signal to the control input on the analog switch 88. When the output signal from the differential amplifier 62 is negative, the output of the comparator 83 is switched to a logic high level, and a logic high signal is coupled to the control input on the analog switch 88.

The polarity of the armature current (IA) signal can be inverted through operation of the analog switch 88. The IA signal is a dual polarity signal which will be positive for motoring operation and negative for regenerating operation when the armature is rotating in the forward direction. Similar to expression (4)–(7) in the introduction, the following expressions for the motoring mode and the regenerating mode can be used to relate armature voltage (MVA), counter-EMF (CEMF) and armature current IA.

$$CEMF = MVA - (IA)(RA) \text{ (motoring)} \qquad (12)$$

$$CEMF = MVA + (IA)(RA) \text{ (regenerating)} \qquad (13)$$

Under "no-load" conditions IA is zero and these equations reduce to $$CEMF = MVA \text{ (at no-load)} \tag{14}$$

The voltage rating for DC motors is generally given for both no-load and full-load conditions. For example, a DC motor rated at 220 v/240 v is rated at 220 volts maximum armature voltage with no load and at 240 volts maximum armature voltage when driving a full load. By referring to equation (14) above, it will be seen that the no-load voltage rating of 220 volts also defines the rated counter-EMF.

Referring to FIG. 5, a no-load armature voltage or maximum CEMF rating is represented by a DC reference signal coupled through a CEMF input on the CEMF limiting circuit 60. This is a negative DC signal that is coupled to a summing junction 89 associated with a voltage-regulating amplifier 90. The other signal received at the summing junction 89 represents the IR voltage drop in equations (12) and (13) above. To generate the IR voltage drop signal, the IA signal from the armature feedback loop is coupled to a second input on the CEMF limiting circuit 60.

Figure 6A:
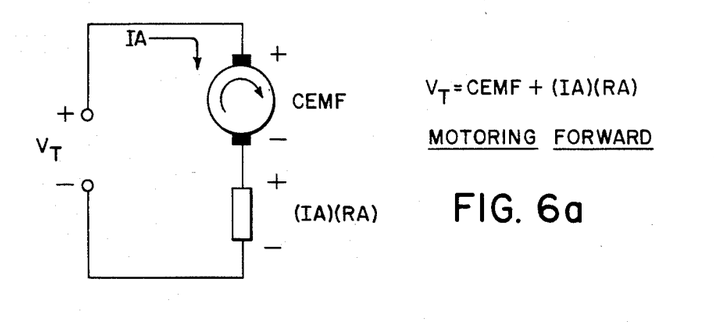
FIGS. 6a–6d are schematics illustrating the relationship of the counter-EMF and the IR voltage drop to the armature terminal voltage.
Figure 6B:
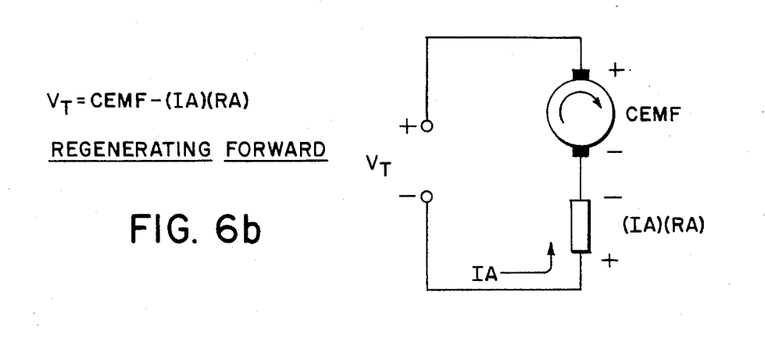
Figure 6C:
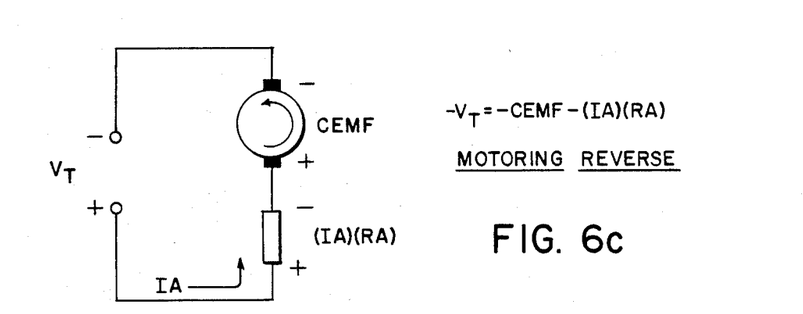

Referring to FIGS. 6a–6b, it will be seen that armature current (IA) flows in one direction when the motor is motoring in the forward (clockwise) direction (FIG. 6a) and that armature current (IA) flows in the reverse direction when the motor is regenerating in the forward (clockwise) direction (FIG. 6b). Armature current (IA) also flows in the reverse direction when the motor is motoring in the reverse (counterclockwise) direction (FIG. 6c). When the motor is operated in the reverse direction in the regenerating mode (FIG. 6d), the armature (IA) again flows in the forward direction as it did in a case shown in FIG. 6a.

Next to FIGS. 6a–6d are the expressions for armature terminal voltage ($V_T$) in terms of counter-EMF and IR voltage drop. For motoring operation the IR voltage drop is algebraically summed with the counter-EMF to obtain the armature terminal voltage ($V_T$). Because the signs of the counter-EMF and the IR voltage drop are the same, their magnitudes are added to obtain the armature terminal voltage. For regenerating operation the IR voltage drop is also algebraically summed with the counter-EMF to obtain the armature terminal voltage ($V_T$). Because the summed quantities have different signs, the IR voltage drop is effectively subtracted from the CEMF quantity.

In the mode shown in FIG. 6a, the IA signal from the inverter and switches 25 in FIG. 1 will be positive, due to an enabling signal on the FORWARD enable line. Because the reference signal at the CEMF output in FIG. 5 is always negative, and because the IA signal is positive for the case in FIG. 6a, they can not be summed as indicated by the equation associated with FIG. 6a. Therefore, the IA signal is inverted by an inverting/non-inverting circuit and the inverted signal is scaled to the IR voltage drop before being summed with the negative CEMF reference signal. The resulting negative signal is then compared with a signal related to the armature voltage that is sensed by the voltage sensing circuit 61 in FIG. 1.

Figure 6D:
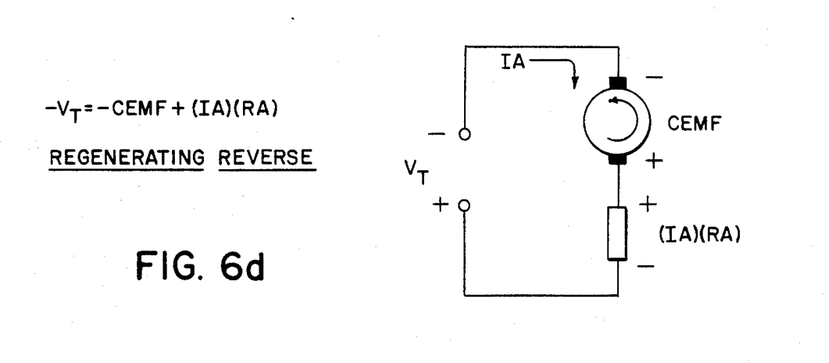

The polarity of the IA signal for motoring and regenerating is different for forward rotation than for reverse rotation. It will be seen that the IA must be inverted for the cases shown in FIGS. 6a and 6b, due to the negative CEMF reference signal used in FIG. 5, but need not be inverted for the cases shown in FIGS. 6c and 6d. The inverting or non-inverting of the IA signal corresponds to the polarity of the armature voltage polarity signal (VA±). When the armature voltage is positive (VA±), the case in either FIG. 6a or 6b is present, and the IA signal is inverted. When the polarity of the armature voltage is negative (VA−), the case in either FIG. 6c or 6d is present, and the IA signal is not inverted in generating a signal proportional to the IR voltage drop.

The IA signal is therefore coupled to the inverting/non-inverting circuit in FIG. 5, which includes an amplifier 91 with an inverting (−) input connected through one resistor 92 and with a non-inverting (+) input connected through a parallel resistor 93 to the IA signal input. The inverting (−) input is also connected through another resistor 94 to the output of the amplifier 91. The output of the amplifier 91 is connected through another resistor 95 to an RC circuit including a shunt capacitor 96 and another resistor 97 in series with the output resistor 95. The non-inverting (+) input of the amplifier 91 is connected through the analog switch 88 to ground so that when the switch is closed the non-inverting (+) input will be at ground potential. The values of the resistors 92, 93 and 94 connected to the amplifier 91 are equal and the gain of the amplifier network is 1:1. With the switch 88 closed the signal at the non-inverting (+) input is pulled down to zero volts and the amplifier 91 becomes biased to invert the IA signal. With the switch open there will not be any current flow through the resistors 92, 93 and 94, and the potential at the output of the amplifier 91 will be the same as the potential provided by the IA signal. To summarize then, when the armature voltage is positive, the switch 88 is closed to invert the IA signal. When the armature voltage is negative, the switch 88 remains open to couple a non-inverted IA signal to the RC network.

The RC network includes a capacitor 96, and a resistor 97 with a value selected to generate a signal proportional to the IR voltage drop in the armature 11. When negative, this signal will be added at junction 89 to the CEMF reference signal, and when positive, this signal will be subtracted from the CEMF reference signal to provide an armature voltage reference signal.

When the MVA signal exceeds the sum of the CEMF reference signal and signal proportional to IR voltage drop, an auxiliary field current reference (AUX IF REF) voltage will be generated at the output of the amplifier 90. The auxiliary field current voltage (AUX IF REF) will be negative, and because it is algebraically summed with the positive field current reference (IF REF) signal it will reduce the total reference signal into the summing input 32 seen in FIG. 1.

The other signal received at the summing input 32 is the field current feedback (IFFB) signal. This signal is algebraically summed with the total reference signal and if there is a difference, a field current error (IFE) signal is generated to the field regulator 31 to adjust the field firing angle command (FFAC) signal.

When the total reference signal into summing junction 32 is reduced there will be a change in the field current error (IFE) signal to cause an adjustment in the field firing angle command (FFAC) signal that will reduce the field current in the field winding 12. The reduction in field current will reduce flux in the field, which also reduces the counter-EMF generated by the motor. This, in turn, will reduce the armature voltage, which will be sensed through a reduction in the magnitude of the MVA signal. The armature voltage will be reduced until a signal responsive to actual armature voltage is matched or exceeded by the armature voltage reference signal.

To compare the MVA signal with the reference signal from junction 89, the MVA signal is coupled through a resistor 98 to a junction with the inverting (−) input on the amplifier 90. Two RC networks are coupled in series across this resistor 98. The first RC network includes a series resistor 99 and a shunt capacitor 100 operating as a filter. The second RC network includes a capacitor 101 and resistor 102 in series with the resistor 99. This second RC network generates a derivative signal to boost the MVA signal which is summed at the inverting input (−) on the amplifier 90. The derivative signal is added to the MVA signal in anticipation of reaching the counter-EMF limit to prevent temporary excursions above the limit. Thus modified, the MVA signal is compared with the maximum armature voltage reference signal that was adjusted for the IR voltage drop.

Where there is a net positive signal at the inverting (−) input of the amplifier 90, a negative signal is generated at the output of the amplifier 90. This negative signal is coupled through a diode 106 to the summing junction 32 in FIG. 1. A resistor 104 and a capacitor 105 are connected from the diode 106 to the inverting (−) input to control the response of the amplifier 90 to the signals it receives at its inverting (−) input. A second diode 103 is connected from the output of the amplifier 90 to the inverting (−) input, but it does not conduct with the output negative and the inverting (−) input positive.

Where there is a net negative signal at the inverting (−) input (the MVA signal as modified being less than the signal from junction 89), the output becomes slightly positive, but the first diode 106 blocks the signal. The diode 103 connected from the output of the amplifier 90 to the inverting (−) input prevents the output of the amplifier 90 from going positive by more than 0.6 volts. The CEMF limiting circuit 60 will therefore generate either a negative auxillary field current reference (AUX IF REF) voltage or it will generate a zero voltage.

Referring again to FIG. 1, it should now be understood that the invention has provided two separate circuits for reducing field current. The first is the field weakening circuit 37 which is responsive to speed feedback. The second is the CEMF limiting circuit 60 which is responsive to armature voltage and current for detecting excessive counter-EMF, which can be reduced by reducing field current.

The integrated circuits that can be used in constructing the circuits illustrated in FIGS. 4 and 5 are as follows:

| Reference No. | Components | Description |
|---|---|---|
| 48, 51, 53 62, 70, 71 90, 91 | operational amplifiers | LM 348 operations amplifiers manufactured by National Semiconductor Corp. |
| 45 | multiplier/ divider | RC 4200 analog multiplier/divider circuit manufactured by Raytheon |
| 83 | comparator | LM 339 comparator by National Semiductor Corp. |
| 88 | analog switch | DG 211 analog switch manufactured by Signe- |

-continued

| Reference No. | Components | Description |
|---|---|---|
| | | tics Corp. |

It will be obvious to those skilled in the art that certain modifications might be made in the details of the above-described circuits without departing from the principles of the invention. So, to apprise the public of the scope of the invention the following claims are made.

We claim:

1. A method of operating a DC motor of the type having a field winding and a rotating armature to control the rotational speed of the armature when the DC motor is operated above base speed in the constant horsepower speed range, the DC motor also being of the type that generates a counter-EMF, the method comprising:
   generating a speed feedback signal proportional to the speed of the armature;
   generating a speed error signal in response to the speed feedback signal and a speed command input in the constant horsepower speed range;
   driving the speed of the DC motor above base speed in response to the speed error signal;
   sensing field current to generate a field current feedback signal;
   generating a field reference signal and algebraically summing the field reference signal with the field current feedback signal to control the energizing of the field winding at rated field current when the motor is operated at a speed below base speed; and
   reducing the field reference signal that is summed with the field current feedback signal in response to a speed feedback signal that represents a speed greater than the base speed to cause a reduction in field current below rated field current.

2. The method of claim 1, further comprising the steps of:
   sensing armature voltage and armature current and generating an auxiliary field reference signal which is representative of the generated counter-EMF under load conditions;
   algebraically summing the field reference signal and the auxiliary field reference signal to provide a total reference signal for controlling the energizing of the field winding; and
   wherein field current is reduced in response to an increase in the magnitude of the auxiliary field reference signal.

3. The method of claim 2, further comprising the step of algebraically summing the total reference signal and the field current feedback signal in controlling the energizing of the field winding.

4. A motor control circuit for operating a DC motor of the type having a field winding and a rotating armature to control the rotational speed of the armature when the DC motor is operated above base speed in the constant horsepower speed range, the DC motor also being of the type that generates a counter-EMF, and wherein the motor control comprises:
   means for generating a speed feedback signal proportional to the speed of the armature;
   means for generating a speed error signal in response to the speed feedback signal and a speed command input in the constant horsepower speed range;

means for driving the speed of the DC motor above base speed in response to the speed error signal;

means for sensing field current to generate a field current feedback signal;

field current error signal means for algebraically summing a field reference signal with the field current feedback signal to control the energizing of the field winding at rated field current when the motor is operated at a speed below base speed; and field weakening means responsive to a speed feedback signal that represents a speed greater than the base speed for reducing the field reference signal to the field current error signal means to reduce current in the field winding below rated field current.

5. The circuit of claim 4, further comprising:

means sensing and responding to armature voltage and armature current for generating an auxiliary reference signal when the counter-EMF exceeds a reference level; and wherein the field current error signal means is also responsive to the auxiliary reference signal when the counter-EMF exceeds a reference level to reduce current in the field winding.

6. A method of operating a DC motor of the type having a field winding and a rotating armature to control the rotational speed of the armature when the DC motor is operated above base speed in the constant horsepower speed range, the DC motor also being of the type that generates a counter-EMF, the method comprising:

sensing current in the field winding to generate a field current feedback signal;

regulating current in the field winding through a field current regulator loop in which a field current error signal is generated in response to algebraic summation of a field current reference signal and the field current feedback signal;

sensing armature voltage to generate an armature voltage feedback signal;

sensing armature current to generate an armature current feedback signal;

further regulating current in the field winding through a counter-EMF feedback loop in which an auxiliary reference signal representative of the counter-EMF is derived from the armature voltage feedback signal and the armature current feedback signal and in which the auxiliary reference signal is algebraically summed with the field current reference signal and the field current feedback signal;

generating a speed feedback signal proportional to the speed of the armature; and reducing the field current reference signal when the speed feedback signal represents a speed greater than the base speed to reduce current in the field winding below rated field current.

* * * * *

UNITED STATES PATENT AND TRADEMARK OFFICE
CERTIFICATE OF CORRECTION

PATENT NO. : 4,549,122

DATED : October 22, 1985

INVENTOR(S) : William E. Berkopec et al.

It is certified that error appears in the above-identified patent and that said Letters Patent is hereby corrected as shown below:

In column 5, line 35     "IF-6F and IR-6R" should be --1F-6F and 1R-6R--.

In column 5, lines 40 and 41     "Ser. No. 532,065," should appear before "which".

In column 12, line 1     the second equation "$(V\underline{A+})$" should be --$(VA+)$--.

In column 13, line 57     under Description, "operations" should be --operational--.

Signed and Sealed this

*Twenty-fifth* Day of *February 1986*

[SEAL]

*Attest:*

DONALD J. QUIGG

*Attesting Officer*     *Commissioner of Patents and Trademarks*